Patented Mar. 5, 1935

1,993,660

UNITED STATES PATENT OFFICE 1,993,660

INDANTHRONE PRINTING COLOR

Robert J. Goodrich, South Milwaukee, and Joseph Deinet, Milwaukee, Wis., assignors to E. I. du Pont de Nemours & Company, Wilmington, Del., a corporation of Delaware No Drawing. Application October 26, 1931
Serial No. 571,280

11 Claims. (Cl. 260—31)

This invention relates to indanthrone dyestuffs. More particularly, this invention deals with sulfonation derivatives of halogenated indanthrones, which are characterized by distinctive printing qualities.

It is an object of this invention to produce indanthrone dyestuffs which are particularly adapted for printing fabrics and which, when thus used, produce upon fabric blue colors of good fastness to bleach.

Other and further important objects of this invention will appear as the description proceeds.

We have found that when halogenated indanthrones, for instance, 3,3'-dichloro-N-dihydro-1,2,2',1'-anthraquinoneazine, are treated with sulfonating agents in the presence of dehydrating agents under conditions as more particularly described below, products result containing both sulfur and halogen in stable combination. We further found that these novel compounds, to which we shall hereinafter refer as sulfonation derivatives of halogenated indanthrone, possess greatly enhanced tinctorial value when used for printing purposes. They further possess fast aging qualities and other desirable characteristics which make them exceptionally valuable for use in printing fabric. Due to their chlorine content, our novel compounds are further characterized by great fastness to bleach.

Although we designated above our novel compounds as sulfonation products, it should be understood that we are not implying any definite structure to the product. It is practically impossible to ascertain whether the treatment with sulfonating agents introduces sulfonic acid groups into the indanthrone body, or whether sulfones are formed involving two indanthrone nuclei to each sulfur atom. Whatever the structure, the beneficial effect on the tinctorial strength of the resulting mass is outstanding, and cannot generally be duplicated by using sulfonating agents alone.

In certain cases, where chlorosulfonic acid is used as sulfonating agent without other dehydrating agents, we found that the product, although of itself not highly useful for printing purposes, produces a product of exceptionally valuable printing qualities when treated in sulfuric acid with additional halogenated indanthrone which had not been treated with chlorosulfonic acid. Whether this is due to a reaction between the sulfonation product and the non-sulfonated body, with the possible production of a sulfone body, is practically impossible of determination. In all cases, however, it seems general that the dyestuff acquires highly valuable printing characteristics when its sulfur content is roughly about ½ atom per indanthrone molecule.

From the sulfates of indanthrone produced according to German Patent No. 313,724, our novel products differ in the stability of their sulfur content. Thus, the products of German Patent No. 313,724 readily hydrolyze in alkaline solution, splitting off the sulfuric acid group, which is evidently attached to the N-atoms of the azine ring. Our products, however, do not lose their sulfur content by hydrolysis, indicating that, in whichever form it is present, it is probably attached to the anthraquinone nuclei.

From the dibromo-diamino-indanthrone compound produced according to Example 2 of U. S. Patent No. 893,508, our novel products differ in their shade. The product of U. S. Patent No. 893,508, would print cotton a bluish green shade, due to its content of amino groups, which act as auxochromes. Our novel products contain no auxochromic groups, and therefore print cotton fabric in pure blue shades, which are characteristic of indanthrone dyeings in general.

Our novel products contain both sulfur and halogen; but they should not be confused with the intermediate dibromo - indanthrone - sulfuryl - chloride complex bodies produced according to U. S. Patents Nos. 1,862,843 and 1,862,844. The latter complex bodies are unstable and lose their sulfur content as well as part of the halogen upon treatment with dilute aqueous alkali. Our novel compounds, however, are stable under similar conditions.

Our novel compounds are further to be distinguished from the indanthrone-enol-esters of sulfuric acid produced by reacting with a sulfonating agent upon an indanthrone body in the presence of strong reducing agents. (See British Patent No. 251,491 of May 3, 1926.) The latter bodies are in reduced (leuco) form, and their sulfur content is unstable toward dilute acids and mild oxidizing agents. Our novel compounds, however, are in the ketonic form, and must be mixed with the usual reducing agents for the purpose of printing. Moreover, their sulfur content cannot be eliminated by treatment with dilute acids and mild oxidizing agents.

Taking all the above distinctions in view, our novel products may be defined as sulfonation products of halogenated indanthrone, containing both sulfur and chlorine in stable union (but no auxochromic substituents), characterized by exceptionally improved printing qualities of which the most important is their enormous tinctorial power compared to the unsulfonated halogenated indanthrone bodies, and capable of yielding prints of characteristic indanthrone-blue shade and of excellent bleach fastness. Another interesting characteristic of our novel compounds is their increased solubility in the alkaline hydrosulfite vat as compared to the non-sulfonated halogenated indanthrone body.

Our novel products may be prepared in general by three methods.

One method consists of reacting halogenated indanthrone with sulfonating agents in the presence of dehydrating agents. As sulfonating agent, sulfuric acid, oleum, or chlorosulfonic acid may be used. As dehydrating agent, one may select phosphorus pentoxide, acetic anhydride, or other well known reagents.

According to another method, the oxidized (azine) form of halogenated indanthrone is used as initial material, or else one treats the reduced form (dihydro-azine) with sulfonating agents in the presence of oxidizing agents. In this case it is not necessary to add dehydrating agents; although, of course, an excess of sulfonating agent is used insuring an anhydrous medium throughout the reaction.

According to a third method, chloro-sulfonic acid is used as sulfonating agent without the addition of either dehydrating or oxidizing agents. There results an intermediate body which in itself is not highly useful for our purpose. But when this body is dissolved in sulfuric acid together with an equal or excess quantity of non-sulfonated halogenated indanthrone and the entire mass then reprecipitated by pouring into water, the final product possesses the desirable printing qualities which are characteristic of the products by the first two processes. The theory of reaction in this third mode of operation is too hazy to be of any value. It appears that the intermediate body at first produced by the treatment with chloro-sulfonic acid undergoes a chemical change upon subsequent solution in sulfuric acid, and apparently further reacts with part or all of the added non-sulfonated indanthrone body.

Without limiting our invention to any specific procedure, the following examples are given to illustrate our preferred mode of carrying out the same. Parts given are parts by weight.

Example 1

10 parts of the halogenated indanthrone body as prepared in Examples 1 to 4 of U. S. Patent No. 1,862,843, are added to 80 parts of chlorosulfonic acid at about 20 to 22° C. and stirred at this temperature for about 18 hours. 6.2 parts of phosphorous pentoxide are now added; the mass is stirred for 15 minutes, warmed up to 35° C. and stirred at this temperature for about 1 hour. The mass is then poured into a mixture of 500 parts of water and 300 parts of crushed ice. 10 parts of sodium bisulfite are now added; the mixture is heated up to 95–100° C. during a period of about 2 hours, and held at this temperature for about ½ hour. It is now filtered, washed with a ½% sodium chloride solution and finally with cold water.

The resultant paste yields blue prints of great brilliance, fast aging qualities, and excellent fastness to chlorine. Its leuco salt is exceedingly soluble in the standard hydrosulfite vat, and the dyestuff may be used for cold dyeing.

The product may be purified by dissolving it in 10 parts of 95% sulfuric acid, slowly diluting the latter with water to about 81%, and filtering off the crystals formed.

The product contains both chlorine and sulfur, but no phosphorus.

Example 2

10 parts of the halogenated indanthrone body as used as initial material in Example 1 are added to a mixture of 80 parts of 25% oleum and 1.2 parts of 70% nitric acid at a temperature of about 15 to 20° C. The mixture is stirred for about ½ an hour until the dyestuff has dissolved, and the solution is heated to 115–120° C. for about one hour. It is then poured into water and further worked up with sodium bisulfite, and isolated as in Example 1.

The product is similar in properties to that of Example 1.

Example 3

10 parts of the halogenated indanthrone body as used in Example 1 are dissolved in a mixture of 8 parts of 22.8% oleum and 30 parts of sulfuryl chloride at a temperature of 15–20° C. After stirring for about 15 minutes, the solution is warmed up to 42–44° C. and held at this temperature for ½ hour. The mass is then poured into ice water, and further worked up as in Example 1.

The product analyses

| | Per cent |
|---|---|
| Chlorine | 15.58 |
| Sulfur | 2.22 |

Example 4

10 parts of the initial material as used in Example 1 are dissolved with cooling in 40 parts of chloro-sulfonic acid and stirred for about 18 hours at a temperature of 3 to 7° C. 10 parts of 24.5% oleum are now added. The mixture is warmed up and stirred at 20–25° C. for about 23 hours; then warmed up further to about 45° C. and held at this temperature for one hour. The mass is then poured into ice water, and further worked up as in Example 1.

The product is similar in properties to that of Example 1. Its sulfur content is 2.2%.

Example 5

10 parts of the initial material as used in Example 1 are dissolved in 80 parts of chloro-sulfonic acid at a temperature of 20 to 25° C., and then slowly heated to about 85° C. and held at this temperature for about ¾ hour. The mass is poured into a mixture of 500 parts of water and 300 parts of crushed ice; then filtered, and washed acid-free with cold water.

The intermediate body thus produced dissolves in the hydrosulfite vat with a blue color from which cotton may be dyed a dull reddish violet shade. It is sparingly soluble in nitrobenzene, and analyzes:

| | Per cent |
|---|---|
| Chlorine | 16.04 |
| Nitrogen | 4.45 |
| Sulfur | 2.80 |

3 parts of this intermediate product are now mixed with 10 parts of the halogenated indanthrone body as used initially in Example 1, and added to 130 parts of sulfuric acid monohydrate at a temperature of 20–22° C. The mass is stirred for about 18 hours, then poured into 1300 parts of water, filtered, and washed acid-free with cold water.

The resultant paste when used for printing fabric yields prints of distinctly improved strength as compared to the halogenated indanthrone body used as initial material.

Example 6

10 parts of the halogenated indanthrone body as used in Example 1 are dissolved in 150 parts of 100% sulfuric acid at a temperature of 15–20° C. 20 parts of acetic anhydride are slowly added, and the mixture is stirred at 20 to 22° C. for about 18 hours. The mass is now warmed to 50–52° C. and maintained at this temperature for about 2 hours. 1500 parts of water are now slowly added, the temperature being kept down below 55° C. 10 parts of sodium bisulfite are now introduced. The mass is stirred at room temperature for about 20 hours, then heated to 95° C. for about 1 hour, filtered, and further worked up as in Example 1.

The product is similar in properties to that of Example 1, but both its dyeings and prints are somewhat greener in shade than those of the product of Example 1.

Example 7

10 parts of the halogenated indanthrone body as used in Example 1 are dissolved in 60 parts of sulfuric acid monohydrate at a temperature of 15–20° C. and 20 parts of chlorosulfonic acid are added. The mixture is then heated to about 75° C. and held at this temperature with stirring for about 2 hours. The mass is now poured into 1000 parts of cold water, 10 parts of sodium bisulfite are added, and the mixture is stirred for 20 hours. It is now heated at 95–100° C. for about 2 hours, and filtered; the filter cake is washed first with a 0.25% sodium chloride solution and then with cold water.

The product is similar in properties to those of Examples 1 to 6 inclusive.

Example 8

10 parts of 3,3'-dibromo-indanthrone as obtained, for instance, according to U. S. Patent No. 775,369 are dissolved in 80 parts of chlorosulfonic acid at about 15 to 20° C. 10 parts of phosphorus pentoxide are now added, and the mixture is stirred at 20–22° C. for 30 minutes. It is now heated to 55° C.; held at this temperature for about 40 minutes, cooled to 20° C., poured carefully into 800 parts of ice water, filtered and washed with cold water until free of acid.

The resultant dyestuff dissolves in the alkaline hydrosulfite vat much more readily than the initial material, and dyes cotton therefrom in greenish blue shades. Its prints are similarly greenish blue and considerably stronger than those produced by the parent material. Analysis shows that it contains both bromine and sulfur.

Example 9

10 parts of dry trichlor-indanthrone (prepared by suspending indanthrone in nitrobenzol, and passing in chlorine until a quantity corresponding to three atoms per mole has been absorbed) are dissolved in 65 parts of chlorosulfonic acid at a temperature of about 15–20° C., and 14 parts of 24.5% oleum are added. The mixture is stirred at 20–22° C. for about 22 hours, then heated at 43–50° C. for about 1 hour, cooled, and further worked up as in Example 1.

The product is similar in properties to that of Example 1.

Example 10

10 parts of dry anthrene blue GCD ("Colour Index" No. 1113) are dissolved in 80 parts of chlorosulfonic acid at a temperature of 20 to 25° C. The remainder of the procedure is then followed as in the first paragraph of Example 5 above.

The resultant intermediate compound contains both chlorine and sulfur. It dissolves readily in the alkaline hydro-sulfite vat with a blue color, from which cotton may be dyed a dull reddish-violet shade.

3 parts of this intermediate product are now mixed with 10 parts of anthrene blue GCD ("Colour Index" No. 1113), and the mixture is added to 130 parts of sulfuric acid monohydrate at a temperature of 20–22° C. The mass is stirred for about 18 hours, then poured into 1300 parts of water, filtered, and washed acid-free with cold water.

The product has properties similar to those of anthrene blue GCD ("Colour Index" No. 1113), except that it produces prints of greater tinctorial strength and that it is more soluble in the alkaline hydrosulfite vat.

It will be understood that many variations and modifications may be practiced with our invention, without departing from the spirit of the same.

Our novel products in general are characterized by yielding an olive green solution in concentrated sulfuric acid (95%, C. P.). They all contain combined halogen and sulfur. They are very soluble in the vat and can be dyed cold; they can also be dyed with sodium sulfide. Our novel products are all characterized by exceptionally good printing qualities, with particular reference to tinctorial strength and fast aging qualities.

The printing with our novel products may be effected in the customary manner, as will be readily understood to those skilled in the art. If desired, dispersing agents or assisting agents may be mixed with our novel products to improve further their adaptability for printing purposes.

In the claims below it should be understood that where new products, dyestuffs, or articles of manufacture are claimed, we mean to include these bodies not only in substance, but also in whatever state they exist when applied to material dyed, printed, or pigmented therewith.

We claim:

1. A sulfonation derivative of halogenated indanthrone as herein described, containing about one atomic portion of sulfur per two moles of halogen indanthrone and also halogen in stable combination, said dyestuff being characterized by high tinctorial strength when used for printing fabric, and producing, when thus used, prints of characteristic indanthrone-blue shades and of good fastness to bleach.

2. A sulfonation derivative of halogenated indanthrone as herein described, containing about one atomic portion of sulfur per two moles of halogen indanthrone and also chlorine in stable combination, said dyestuff being characterized by high tinctorial strength when used for printing fabric, and producing, when thus used, prints of characteristic indanthrone-blue shades and of good fastness to bleach.

3. A sulfonation derivative of dihalogen-indanthrone containing about one atomic proportion of sulfur per two moles of dihalogen indanthrone in stable combination, said dyestuff being characterized by high tinctorial strength when used for printing fabric, and producing, when thus used, prints of characteristic indanthrone-blue shades and of good fastness to bleach.

4. A sulfonation derivative of dichloro-indanthrone containing about one atomic proportion of sulfur per two moles of dichloro-indanthrone in stable combination, said dyestuff being characterized by high tinctorial strength when used for printing fabric, and producing, when thus used, prints of characteristic indanthrone-blue shades and of good fastness to bleach.

5. A sulfonation derivative of halogenated indanthrone containing about ½ atom of sulfur per molecule of indanthrone.

6. An indanthrone dyestuff containing about one atomic portion of sulfur per two moles of indanthrone dyestuff and also halogen in stable combination, but containing no auxochromic substituents.

7. The process of producing a blue indanthrone dyestuff characterized by excellent printing qualities and good fastness to bleach, which comprises reacting upon halogenated indanthrone with chlorosulfonic acid in the presence of a dehydrating agent.

8. The process of producing a blue indanthrone dyestuff characterized by excellent printing qualities and good fastness to bleach, which comprises reacting upon dichloroindanthrone with chlorosulfonic acid in the presence of a dehydrating agent.

9. The process of producing a blue indanthrone dyestuff characterized by excellent printing qualities and good fastness to bleach, which comprises reacting upon dichloroindanthrone with chlorosulfonic acid in the presence of phosphorus pentoxide.

10. The process of producing a blue indanthrone dyestuff characterized by excellent printing qualities and good fastness to bleach, which comprises reacting upon dichloroindanthrone with chlorosulfonic acid in the presence of oleum.

11. The process of producing a blue indanthrone dyestuff characterized by excellent printing qualities and good fastness to bleach, which comprises reacting upon dichloroindanthrone with chlorosulfonic acid in the presence of acetic anhydride.

ROBERT J. GOODRICH.
JOSEPH DEINET.